United States Patent [19]

Renaud

[11] Patent Number: 4,529,077

[45] Date of Patent: Jul. 16, 1985

[54] CONTROL LINKAGE FOR A DRIVEN COMPONENT

[75] Inventor: Pierre Renaud, Le Plessis Trevise, France

[73] Assignee: Valeo, Paris, France

[21] Appl. No.: 521,382

[22] Filed: Aug. 8, 1983

[30] Foreign Application Priority Data

Aug. 6, 1982 [FR] France ............................... 82 13795

[51] Int. Cl.³ ............................................. F16D 19/00
[52] U.S. Cl. .................................. 192/99 S; 74/473 R
[58] Field of Search ............... 192/98, 99 S; 74/473 R

[56] References Cited

U.S. PATENT DOCUMENTS

| 3,250,357 | 5/1966 | Zeidler | 192/99 S |
| 3,277,987 | 10/1966 | Zeidler | 192/99 S |
| 3,335,833 | 8/1967 | Smirl | 192/99 S |

FOREIGN PATENT DOCUMENTS

| 0023170 | 1/1981 | European Pat. Off. . |
| 647031 | 9/1935 | Fed. Rep. of Germany . |
| 1013080 | 8/1957 | Fed. Rep. of Germany . |
| 1334446 | 7/1963 | France . |
| 1412029 | 8/1965 | France . |
| 539689 | 9/1941 | United Kingdom . |

Primary Examiner—William A. Cuchlinski, Jr.
Attorney, Agent, or Firm—Young & Thompson

[57] ABSTRACT

Control linkage for a component with a substantially linear travel, especially a clutch bearing.

In a control linkage for a driven component with a substantially linear travel, in which a lever comprises, on either side of an axis of rotation a first arm subjected to the action of a control element and a second arm acting on the driven component, the axis of rotation is movable in relation to a fixed frame maintained by guide elements in a path on average transverse to the travel of the driven component, the first arm being connected to the fixed frame by a suspension arm forming a turned-back portion in relation to the lever.

The invention is used for the control of clutch bearings, especially for motor vehicles.

21 Claims, 15 Drawing Figures

CONTROL LINKAGE FOR A DRIVEN COMPONENT

BACKGROUND TO THE INVENTION

The present invention relates, in general terms, to a control linkage for a driven component which has a substantially linear travel, in which a lever comprises, on respective sides of an axis of rotation, a first arm subjected to the action of a control element and a second arm acting on the driven component. The invention applies especially to the control levers of clutch bearings, commonly known as forks, and the following description refers to such uses. However, it must be remembered that this is an important, but not exclusive use of the invention.

Clutch forks known at the present time assume somewhat varied forms. However, they can be described in general terms as levers which comprise, on respective sides of an axis of rotation, in particular a knuckle connected to a fixed frame, a first arm subjected to the action of a control element, actuated, for example, by the clutch pedal of a motor vehicle, and a second arm acting on a clutch bearing. The abovementioned knuckle performs a double function: it constitutes an axis of articulation for the fork, whilst ensuring that it is supported.

As is known, a clutch bearing is intended to act, by pushing (pushed bearing) or by pulling (pulled bearing), on the disengaging device of a clutch, for example, a diaphragm. In the position of rest within a clutch, this disengaging device presses a pressure plate in the direction of a reaction plate, both being fixed in rotation to a drive shaft, thus ensuring the rotational drive of a friction disc interposed between the two plates and fixed to a driven shaft, in practice the input shaft in a gearbox. When it is actuated by the bearing, the device releases the pressure of the pressure plate on the disc, thus allowing the latter to disengage from the plates. As is known, the quality of this disengagement depends greatly on the accuracy with which the bearing is aligned with the diaphragm and therefore the clutch as a whole. Consequently, the manufacturers seek to ensure that the bearing follows as straight and as accurate a path as possible in alignment with the axis of the associated clutch.

They first proposed to have the bearings supported by the associated forks. Such a bearing, called a supported bearing, generally has for this purpose two diametrically opposite journals rotating in bearings fastened to two projections or fingers of the fork. As a result of the method of fastening the latter, the clutch bearing has a path in the form of an arc of a circle, thus leading to a variable radial movement between the bearing and the diaphragm and consequently to wearing of their surfaces in contact.

To mitigate this disadvantage, it was proposed to use bearings, called guided bearings, mounted to slide along a guide tube, commonly called a shaft casing, surrounding the input shaft of a gearbox, or directly on the said shaft. The free end of such a shaft is conventionally mounted in a bearing carried by the drive shaft. In order to reduce the cost and the assembly time, the manufacturers then aimed at eliminating this bearing.

However, the overhung mounting of the input shaft resulted in an increase in the diameter of the latter and therefore an increase in the diameter of the guide tube to the detriment of the cost price.

The applicant also proposed to mount a clutch bearing to slide along two small columns (French Patent Application No. 7,639,540) parallel to the axis of the clutch, but offset. However, the best possible guidance of such a bearing, together with minimum wear, requires a strict parallel alignment of the said columns.

Moreover, in general, because the guided bearings are actuated under the action of pivoting forks of the type mentioned above, wear arises between the contact surfaces of the fork and of the bearing as a function of the position of the axis of rotation of the fork.

The present invention aims to mitigate these disadvantages, whilst ensuring that the bearing zones of the fork have a substantially rectilinear movement and whilst eliminating as far as possible all the sources of wear in respect of the suspension of the fork and its contact with the bearing.

SUMMARY

Within the general framework mentioned above, the invention therefore proposes a control linkage for a driven component with a substantially linear travel, in particular a clutch bearing for a motor vehicle, in which a lever, especially a clutch fork, comprises, on either side of an axis of rotation, a first arm subjected to the action of a control element and a second arm acting on the driven component, characterised in that the axis of rotation is movable in relation to a fixed frame and is held in position by guide elements in a path transverse to the travel of the driven component. According to another characteristic, the first arm is connected to the fixed frame by a suspension arm forming a turned-back portion in relation to the lever.

The present invention is distinguished from known levers mounted rotatably about a fixed pivot axis, in that the suspension of the lever is not effected at its axis of rotation, but by means of an arm independent of it.

The presence of a suspension arm forming a turned-back portion in relation to the lever causes, when, for example, the latter is inclined from a configuration perpendicular to the direction of the travel of the bearing, a translation of the axis of rotation, thus tending to reduce the tendency of the free end of the second arm to move away from rectilinear travel and into a path in the form of an arc of a circle.

In a preferred embodiment the driven component is intended to move on either side of the mean transverse plane of the path of the axis of rotation, and the suspension arm is connected to the fixed frame in a zone substantially included in this mean plane; the said suspension arm then being shorter than the first arm of the lever to which it is connected.

The invention proposes several embodiments, depending on whether the suspension arm is connected by means of joints to the lever and to the frame (in which case it is rigid) or whether it is secured to them in a rigid manner, in which case it is deformable, at least partially, so as to permit the lever to pivot about its axis. The first configuration has the advantage of simplicity, whilst the second eliminates the play which exists in respect of any joint.

The path of the axis of rotation is, for example, a portion of a cylinder or a portion of a plane, the guide elements comprising either a joint, for example of the knife type, or a cylindrical part rolling on a plane surface. It should be noted that in the latter case the cylindrical part is supported either by the lever or by the fixed frame, whilst the plane surface is supported either by the fixed frame or by the lever respectively. Moreover, means for lateral retention parallel to the axis of rotation are provided, so as to prevent any transverse play of the lever in relation to the travel of the driven component.

Because the path of the free end of the second arm of the lever follows a substantially rectilinear course, it is proposed, where clutches are concerned, to make the lever support the associated clutch bearing.

Thus, in relation to a supported bearing of the prior art, a substantially rectilinear movement, favourable to a reduction in the wear between the diaphragm and the bearing, is obtained; and in relation to a guided bearing, the wear is reduced. In fact, in a guided bearing wear occurs, during the actuation of the clutch, as a result of contact of the free end of the second arm of the fork, which describes a path in the form of an arc of a circle, with the bearing plate which a clutch bearing conventionally incorporates and which describes a rectilinear path as a result of the arrangement according to the present invention, the bearing being supported, and this wear is transferred to the level of the axis of rotation, the transverse movement of which is much less than that of the free end of the second arm of a guided bearing. A reduction in wear is achieved.

In addition, the omission of the guide tube is advantageous.

Furthermore, one aspect of the invention prefers that this connection is not made by journals, as in the prior art, but by tabs substantially included in the plane of the lever and of its pivot axis, so as to prevent any transverse play and therefore any wear in respect of this connection between the supported bearing and the lever.

BRIEF DESCRIPTION OF THE DRAWINGS

FIGS. 1 to 14 illustrate by way of example two main embodiments of a linkage according to the invention, which are used in the field of clutch control.

DESCRIPTION OF THE PREFERRED EMBODIMENTS

Figures 1, 1A, 2:
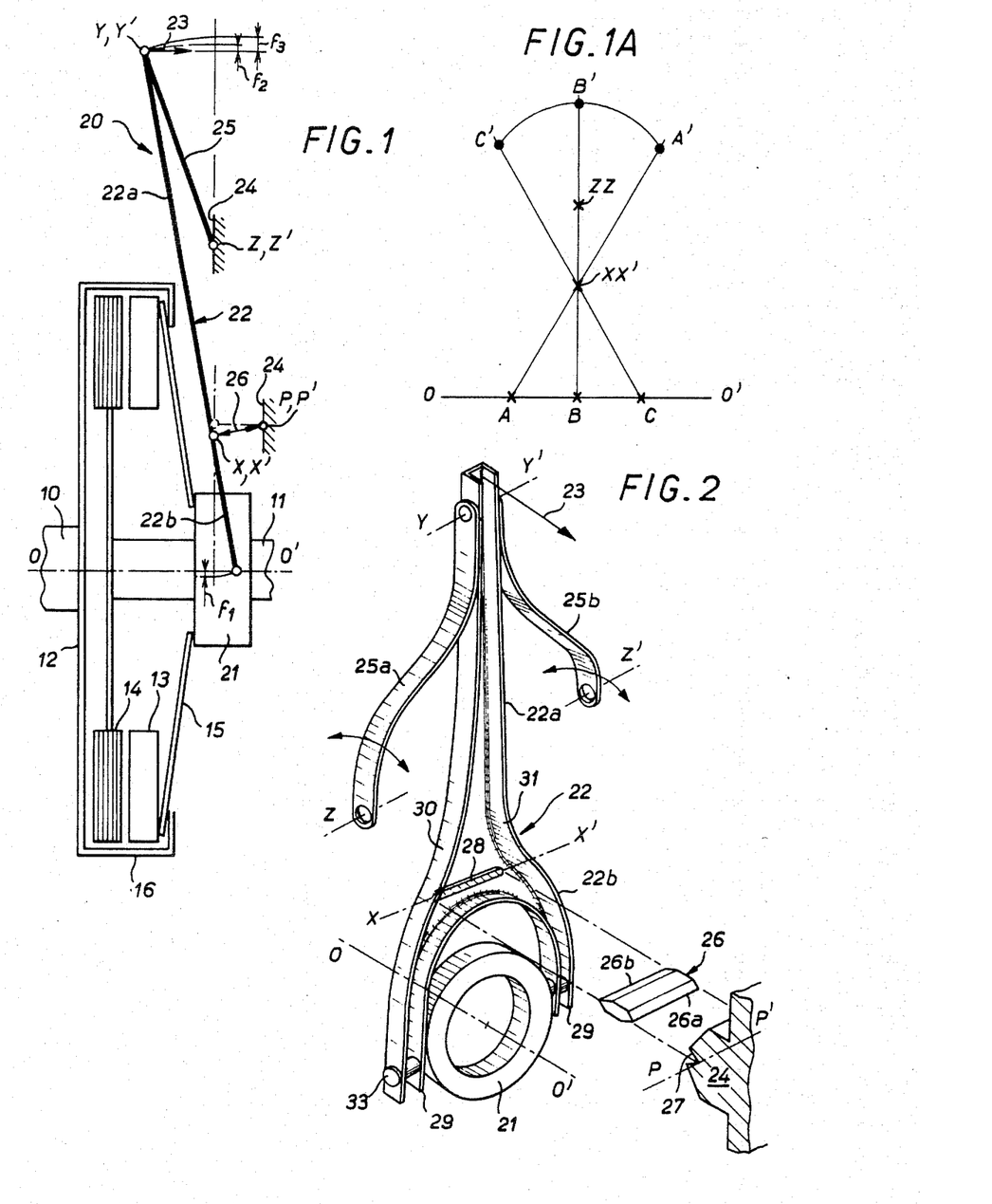
FIG. 1 is a diagrammatic profile view of a clutch linkage according to a first embodiment of the invention, with a clutch controlled by a pushed bearing being indicated diagrammatically.
FIG. 1A indicates diagrammatically the geometrical configuration of the said linkage.
FIG. 2 is a perspective view of the first embodiment of a linkage according to the invention.

FIG. 1 illustrates the principle of the structure of the linkages shown in FIGS. 2 to 6. The bearings shown are of the pushed type; it goes without saying that the invention applies both to pulled bearings (FIGS. 9 to 12) and to pushed bearings (FIGS. 2 to 7).

A clutch, such as that indicated diagrammatically in cross-section in FIG. 1, is located between a drive shaft 10 and a driven shaft 11, here the input shaft of a gearbox (not shown). This clutch comprises a reaction plate 12 fixed in rotation to the drive shaft and a pressure plate 13 coupled in rotation to the reaction plate (by means which are not shown), with the possibility of axial movement in relation to the said reaction plate. A friction disc 14 fixed to the driven shaft is interposed for clamping between these two plates. Elastic means, for example a diaphragm 15, press the pressure plate 13 on its periphery by bearing on the cover 16 fixed to the reaction plate 12, for example by screwing. Because its central zone is depressed towards the inside of the clutch, the diaphragm is designed to ensure the uncoupling of the drive shaft 10 and driven shaft 11 by unclamping the friction disc 14.

The clutch is controlled by means of a clutch linkage 20. The linkage comprises a conventional clutch bearing 21, a clutch lever or fork 22 which carries the bearing, and a control element indicated diagrammatically by the arrow 23 which shows the direction of stress on the lever. This control element is, for example, a system of rods connected to the clutch pedal of a motor vehicle. The lever 22 has an axis of rotation X-X' which separates the lever 22 into a first arm 22a subjected to the action of the control element 23 and a second arm 22b acting on the driven component which the bearing 21 constitutes. The ratio of the first arm to the second arm defines a mechanical advantage associated with the lever. The bearing 21 has a substantially linear travel along the axis 00' of the clutch by means of the control linkage.

The axis of rotation X-X' is movable in relation to a fixed frame 24, and is maintained by guide elements in a path generally transverse to the travel 00' of the bearing 21. In the examples illustrated, the first arm 22a of the lever is connected to the said fixed frame by a suspension arm 25 forming a turned-back portion in relation to the lever, this arm thus helping to guide and to maintain the axis of rotation.

In the embodiment illustrated in FIGS. 1 to 6, the suspension arm 25 is connected to the lever 22 and to the fixed frame 24 by joints YY' and ZZ' respectively. This extremely simple configuration is robust and easy to use, although it gives rise to play at the joints YY' and ZZ'. As regards the axis of rotation of the lever XX' (FIGS. 1 and 2), because of the effect of the loads applied to the ends of the lever, it is supported against a knife 26 interacting with the reference axis PP' which is fixed in relation to the frame 24. Because it is maintained at a given distance from the axis PP', the axis of rotation XX' is forced to follow a circular path describing a portion of a cylinder centered on the said axis PP'. Because of the relatively slight angular movement applied to the lever during operation, the orientation of the knife, as shown in FIG. 1, remains permanently substantially parallel to the travel OO' of the bearing, so that the path of the axis XX' is substantially transverse to the said travel OO'.

The improvement in the linearity of the free end of the second arm 22b of the lever, and therefore of the bearing, in relation to a bearing of the prior art can be explained as follows.

Suppose that the axis XX' is fixed, as in the prior art. When the lever returns to the vertical from its position shown in FIG. 1, the lower end of the latter tends to "descend" below the axis OO' by the amount of a deflection $f_1$, whilst the upper end "rises" above the level of the axis YY' represented by a deflection $f_2$. The suspension arm 25 is intended to cause the upper free end of the lever to "rise" by the amount of a deflection $f_3$ greater than $f_2$ and preferably equal to $(f_1+f_2)$, so as to bring the lower end back into the axis OO'. The axis of rotation also "rises" by a value $(f_3-f_2)$. In practice, the linear movement of this axis is of the order of a millimeter. It emerges that this correction of linearity is all the more effective when the connection of the arm 25 to the lever 22 is distant from the axis (XX'): such a configuration is therefore advantageous in practice.

This reasoning governs the geometrical procedure to be followed (FIG. 1A) to determine the best possible position of the axis ZZ' of articulation of the suspension arm 25 to the fixed frame 24. Let A and C be the extreme positions on the axis OO' occupied by the bearing during its lifetime (in practice, the disengaged position when new and the engaged position when worn). The axis of rotation XX' of the lever is positioned at a distance from A and from C equal to the length of the second arm 22b of the lever: in fact, only one position of XX' is defined in this way, since the latter is displaced, even though over a short distance only. Let B be the middle of the segment AC. The points A', B', C' are then marked, being aligned with the line of the mean position of the axis XX' in the drawing plane, on the one hand, and with A,B,C, respectively, A', B', C' being at a distance equal to the length of the lever 22 from A, B, C respectively. It it then possible to define the centre of the circle passing through A', B', C', and this is the desired line of the axis ZZ'. Since B is the middle of AC, the axis ZZ' determined in this way is located in a plane transverse to the rectilinear travel AC of the driven component, which contains B and the one position of the axis XX'. The suspension axis is then shorter than the first arm 22a of the lever.

It should be noted that this procedure is suitable for obtaining physically a path between A and C which is as straight as possible.

In the event that a person skilled in the art wishes the path to be, in particular, linear over a shorter segment, it is within his abilities to adapt the abovementioned procedure by redefining the limiting points to be considered. If he so desires, a person skilled in the art can also decide to ignore a middle point B, in which case he has a choice of the position of the axis ZZ' on the mean perpendicular of the segment A' C'. It goes without saying that the quality of linearity of the path obtained according to the invention depends on the quality of linearity of the path which would result from using a lever with a conventional fixed axis of rotation, hence the usefulness of adopting the abovementioned procedure with XX' at an equal distance from A and C, but this is only a recommendation.

As illustrated in FIGS. 2 to 13, a lever 22 is preferably made of stamped sheet metal, flanks 30 and 31 being turned back perpendicularly to the mean plane of the lever in order to ensure that it is rigid. As is known, such a clutch lever or fork usually incorporates two fingers 29 to act on the associated bearing 22. Since the stamping of the metal sheets is an inexpensive shaping operation, such a lever has a low cost, but any other shaping process may be employed.

FIGS. 2 to 6 illustrate linkages which are produced as a result of the direct application of the principle of FIG. 1, with joints articulated about the axes XX', YY' and ZZ'. The suspension arm 25 is, in fact, shown there as being formed from two half-arms 25a and 25b symmetrical in relation to the path followed by the lever during its movements. To ensure a low production cost, these half-arms are preferably in one piece (therefore not requiring any intermediate assembly operation) and are produced from strips of constant thickness taken, for example, from the metal sheets. It should be noted that, in view of the joints to which they contribute, these strips are attached to the fixed frame and to the lever 22 parallel to the axes XX', YY' and ZZ' and that their mean plane is perpendicular to these axes.

The lever 22 illustrated by way of example in FIG. 22 is connected to the frame 24 not only by the suspension half-arms, but also by a knife 26, one edge 26a of which interacts with the bottom of a notch 27 made in the frame and the other edge 26b of which interacts advantageously with a stamped portion 28 provided in the lever. After the knife has been interposed between the frame and the lever 22, its edges 26a and 26b constitute respectively the reference axis PP' and the axis of rotation XX'. Such a stamped portion 28 can, in fact, be produced simultaneously if the thickness of the lever at the level of the axis XX' is only slight, otherwise, when the component is solid, a notch can be made by machining. Guidance of the axis of rotation XX' is ensured in this way. In practice, the notch 27 is made in a boss of the frame, as shown in FIG. 2; the lateral faces of this boss, as a result of interaction with the flanks 30, 31, advantageously serve as means of a lateral retention, to prevent any lateral drift of the fork and therefore of the knife which is moreover retained laterally by the lateral ends of the stamped portion 28.

In the alternative embodiment illustrated in FIGS. 3 to 6, the guidance of the axis of rotation XX' in a path substantially transverse to the rectilinear travel OO' of a driven component, that is to say, because of the slight angular movement of the lever, in a path substantially included in the mean plane of the lever during its angular oscillations, is ensured by means of a roller 35 mounted rotatably in relation to the lever and rolling and sliding on a surface 36 which is fixed to the fixed frame and is preferably plane and parallel to the desired path. Inasmuch as the axis of rotation can be approximated to the axis of the roller 35, the path of the latter is then plane, and the radius PP'-XX' is then infinite. The roller 35 is coupled to the lever 22 by means of a flexible claw which keeps it up against a semi-cylindrical stamped portion 38 provided in the lever, whilst the sliding surface 36 consists of an insert 39 attached to the frame by means of a stud 39a.

It is advantageous if the surface 36 is attached to the frame because this avoids the need to provide any local surface treatment for the frame; in contrast, small inserts 39 of any shape and size are much simpler to treat and at a lower cost price.

In an alternative form (not shown), a roller is connected rotatably to the fixed frame 24, whilst the lever carries a sliding surface. The axis of rotation of the lever follows a circular path describing a portion of a cylinder centered on the axis of the roller which thus constitutes the reference axis PP' mentioned above.

Means of lateral retention are provided to prevent any lateral drift of the lever and of the roller parallel to the axis XX'. As regards the lever, these retention means comprise portions 30a and 31a of flanks and projections 40 and 41 in the direction of the frame which are prependicular to the axis XX', and on the frame side they comprise two bearing surfaces 42 and 43 perpendicular to the said axis XX' and facing in opposite directions. The two projections 40 and 41, which are advantageously produced by stamping when the lever is made of sheet metal, retain the roller 35 at its ends, while the flank portions 30a and 31a, which advantageously form part of the abovementioned stiffening flanks when the lever is made of stamped sheet metal, grip the bearing surfaces 42 and 43. Many other alternative forms can be proposed along the same lines by a person skilled in the art.

FIGS. 7 to 12 illustrate another embodiment of a linkage which moves away somewhat from the basic diagram shown in FIG. 1, since here the lever 22 is shown as being connected to the frame by a suspension arm 125 fixed rigidly to the lever and to the frame respectively. In this embodiment, this suspension arm is necessarily provided with a certain deformability or flexibility in order to allow angular oscillations about the axis XX'. Because of the same desire as before to reduce costs, the suspension arm is advantageously produced from strips taken from metal sheets or plates. Because the deformability which results from bending these strips is at its maximum in the direction of their thickness, these strips are preferably arranged parallel to the mean plane of the lever 22.

Figures 7, 8:
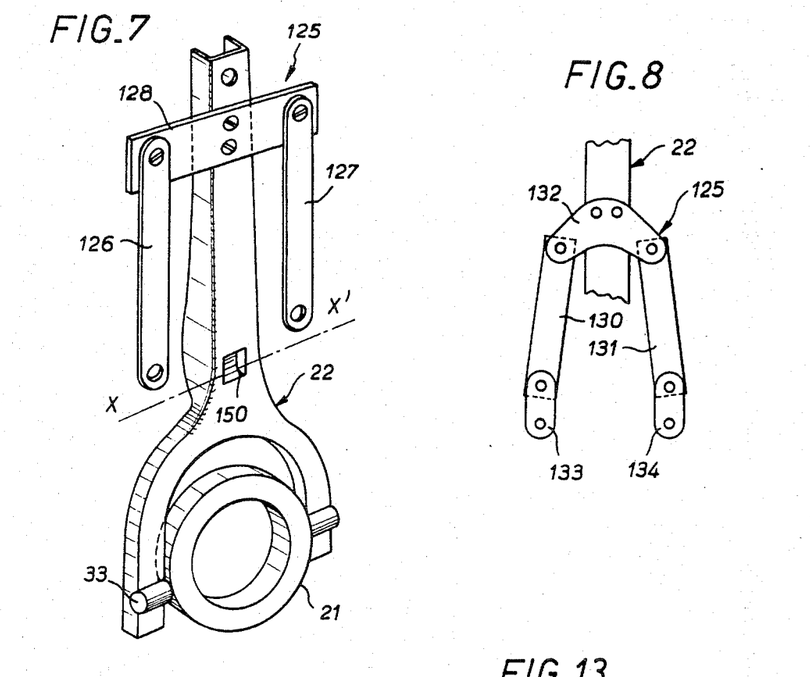
FIG. 7 is a perspective view of a second embodiment according to the invention.
FIG. 8 is an elevation view of an arm of the linkage according to the invention.
Figure 9:
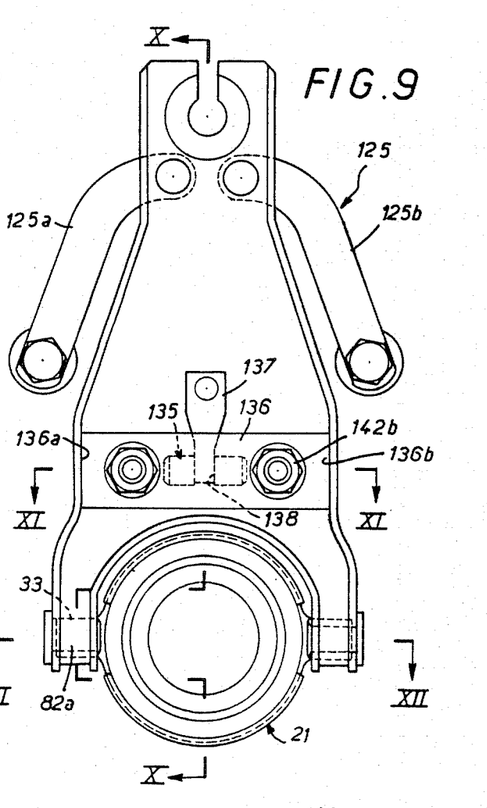
FIG. 9 is an elevation view of another alternative embodiment for controlling a pulled bearing.

In the alternative embodiment illustrated in FIG. 7, the suspension arm 125 consists of a bracket comprising two side strips 126 and 127 fixed to the frame at one of their ends and a transverse strip 128 to which they are fixed at their other end and which is connected to the lever 22. The transverse strip is preferably rigid in order to improve the rigidity of the bracket. In contrast to this, the side blades are necessarily flexible to allow angular movements of the lever. Because these strips 126 and 127 support the lever, they necessarily have high mechanical compression and bending properties and can only be deformed elastically, so that the lever has a neutral position towards which elastic restoring forces bring it back as soon as it moves away from it.

FIG. 8 illustrates an advantageous configuration to be adopted when the elasticity of the suspension arm results in risks of buckling which are too high in view of the weight to be supported and the stresses to be transmitted. The suspension arm 125 comprises two rigid strips 130 and 131 which eliminate any risk of buckling. The flexibility necessary for the said arm is ensured by flexible tabs 132, 133, 134 of small dimensions, by means of which the arm 125 is connected to the lever 22 and to the fixed frame.

FIGS. 9 to 12 illustrate another alternative embodiment of a supporting arm according to the invention, in which the arm 125 consists of two half-arms 125a and 125b in one piece.

FIGS. 7 and 9 to 12 also illustrate other alternative embodiments in respect of the guide means.

According to FIG. 7, the axis of rotation XX' is guided by an at least partially cylindrical boss 150 fixed to the lever and preferably obtained by stamping if the lever is made of sheet metal. The geometrical axis of this portion of a cylinder 150 can be approximated to the axis of rotation XX'. Of course, the opposite solution is likewise possible, the boss being fixed to the frame.

According to FIGS. 9 to 12, guidance is ensured, as in the example illustrated in FIGS. 3 to 6, as a result of the rolling and/or sliding of a roller 135 against a plane surface 136. The lateral retention of the roller 135 is ensured, here, by a claw 137 interacting with a portion 138 of reduced diameter, in addition to projections 140 and 141 similar to the projections 40 and 41 of FIGS. 3 to 6.

Figures 3, 4:
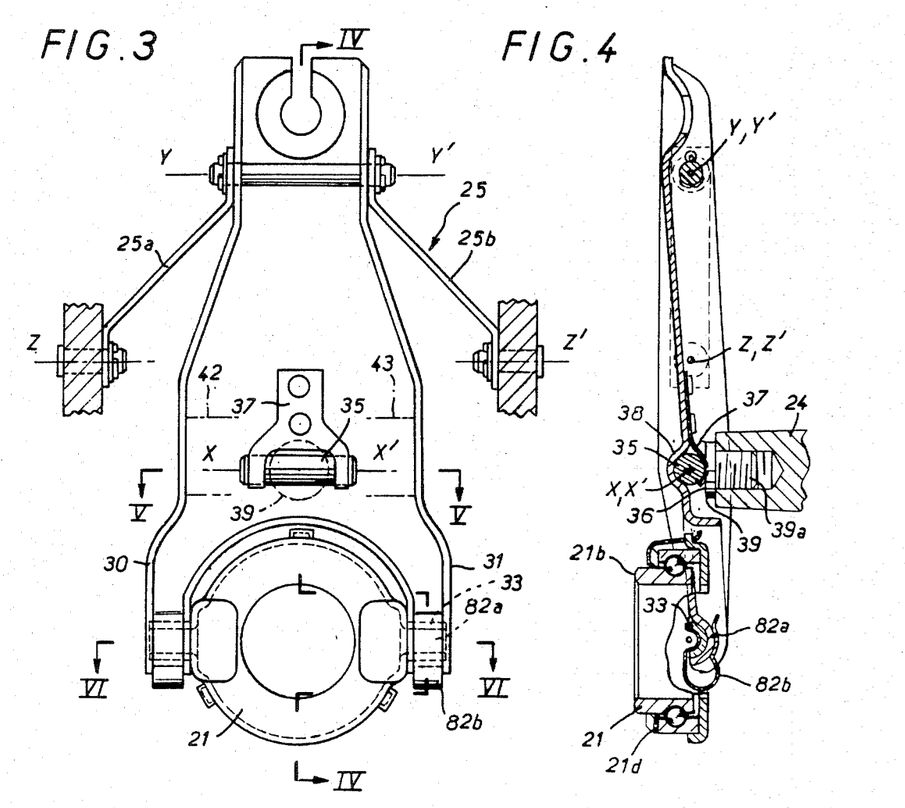
FIG. 3 is an elevation view of another alternative embodiment according to the invention.
FIG. 4 is a profile view of the preceding alternative form in a section along the line IV—IV in FIG. 3.
Figure 5:
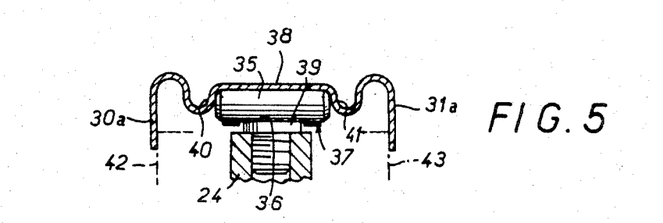
FIG. 5 is a plan view of the preceding alternative form in a section along the line V—V in FIG. 3.
Figure 6:
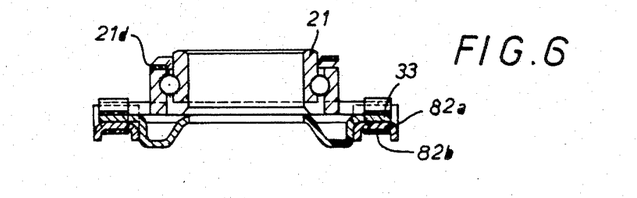
FIG. 6 is a plan view of the abovementioned alternative form in a section along the line VI—VI in FIG. 3.
Figure 10:
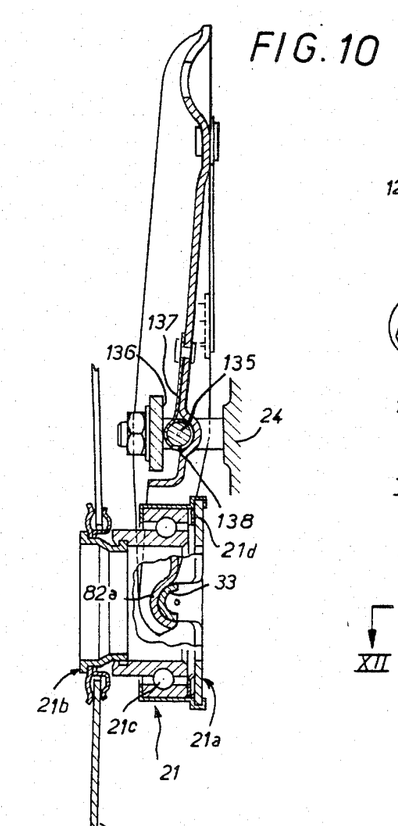
FIG. 10 is a profile view of the abovementioned alternative form in a section along the line X—X of FIG. 9.
Figure 11:
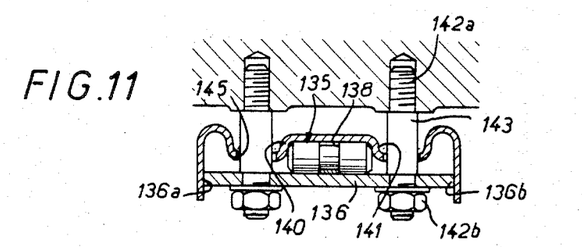
FIG. 11 is a plan view of the abovementioned alternative form along the line XI—XI in FIG. 9.
Figure 12:
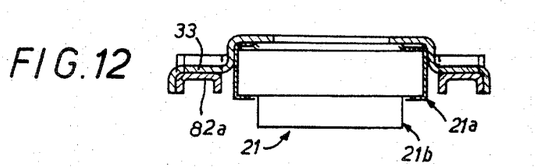
FIG. 12 is a plan view of the abovementioned alternative form along the line XII—XII of FIG. 9.

In view of the fact that the lever 125 shown in FIGS. 9 to 12 actuates a pulled bearing, for the same arrangement of the frame 24 in relation to the clutch as in FIGS. 3 to 6 (a pushed bearing), the support necessary for the lever must be located on the left in FIG. 10 and not on the right as in FIG. 4. The sliding surface 136 is therefore a plate attached to the fixed frame, opposite the latter in relation to the mean plane of the lever, by means of connecting members 142, such as screws 142a and bolts 142b, and the said screws, surrounded by cylinders 143 keeping the plate spaced apart from the fixed frame, pass through the lever via apertures 145 shown in FIG. 11 as passing through the projections 140 and 141 made by stamping in the lever. The edges 136a and 136b ensure, together with the flanks of the lever, the lateral retention of the latter.

The bearings 21 shown in FIGS. 2 to 12 are of the pushed type (FIGS. 2 to 7) or pulled type (FIGS. 9 to 12). Their structure which is conventional and does not form the subject of the invention is not described in detail here. It will be sufficient to indicate, for example, that the bearing 21 consists of an actuating element 21a subjected to the action of the fork and of a drive element 21b for action on the fingers of the diaphragm, the freedom of rotation between these two elements being ensured by a ball bearing 21c. Since the bearing of FIG. 10 is of the pulled type, its drive element passes through the mean plane of the fingers and has a radial shoulder designed to act by traction on the said fingers. Finally, a spring 21d is provided to maintain self-centring, this being coupled to the actuating element by means of lugs in FIG. 4.

The embodiments illustrated in FIGS. 7 to 12 differ from the embodiments illustrated in FIGS. 2 to 6 in that many sources of play and wear have been eliminated. With the same aim in view, the invention proposes a new method of coupling between the clutch lever and the bearing, which is designed to reduce the play and wear in respect of their contact surfaces.

As is known, there is at the present time a principal method of coupling a fork and supported bearing, this being illustrated in FIGS. 4, 7 and 10, which involves retaining journals 33 in semi-cylindrical stamped portions 82a by means of elastic U-shaped clips 82b; these clips are shown in FIG. 4 only, but are used in practice in the alternative embodiments in FIGS. 7 and 10. It will be noted that FIG. 2 is a diagrammatic view.

Figure 13:
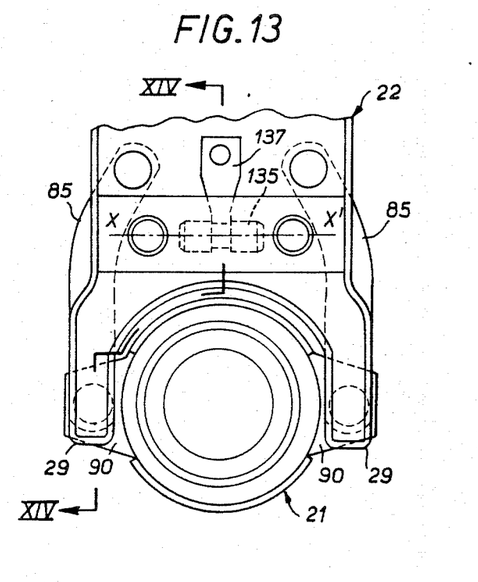
FIG. 13 is an elevation view of a detail of the connection between the bearing and the linkage lever according to the invention.
Figure 14:
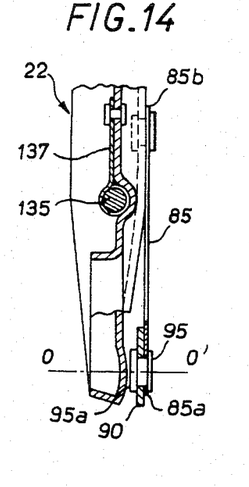
FIG. 14 is a profile view of the preceding assembly in a section along the line XIV—XIV of FIG. 13.

This coupling method results in play between the lever and the supported bearing, which one embodiment of the invention aims to eliminate by means of flexible tabs 85, as shown in FIGS. 13 and 14. These flexible tabs are arranged substantially in the mean plane of the lever and at least partially parallel to the largest dimension of the lever. These tabs are fastened at one 85a of their ends to two bearing surfaces 90 carried by radial arms projecting from the bearing 21. The other ends 85b of the tabs are fastened to the lever 22, preferably in the vicinity of the axis XX'. In the example illustrated in FIGS. 13 and 14, these fastenings are arranged slightly above the said axis.

Because of a certain rigidity which these tabs possess in their plane of smallest dimension, that is to say in the plane of FIG. 13, the tabs oppose any drift of the bearing 21 in this plane in relation to the lever 32, whilst their elasticity or flexibility perpendicular to the said plane permits a slight movement between these two elements along the travel 00' of the bearing.

In the example illustrated in FIGS. 13 and 14, the disengaging forces exerted by the lever are transmitted to the bearing as a result of pressure of the fingers 29 against the plane head 95a of the members 95 for connecting the bearing to the tabs; these are, for example, rivets, and the use of these in a highly conventional way ensures that assembly operations can be carried out at very little cost.

In the exemplary embodiment shown in FIG. 14, the tab 85 is located opposite the fingers 29 in relation to the radial arms 90; it goes without saying that it could likewise be interposed between the fingers and the bearing.

In all the abovementioned exemplary embodiments of the invention, the bearing 21, when illustrated, is of the supported type, this being especially advantageous because there is no need to provide a guide shaft casing for the said bearing; in comparison with a guided bearing of the prior art, a supported bearing with substantially rectilinear displacement according to the invention makes it possible, for one and the same size of bearing surface, to adopt a larger diameter for the input shaft of the gearbox and, for a given dimension of the input shaft of the gearbox, a smaller size of bearing surface. Of course, in some cases, an increase in the dimensions of the input shaft of the gearbox and a reduction in the size of the bearing surface can be achieved simultaneously. It will also be noted that the length of the roller 35, 135 will advantageously be as great as possible to improve the stability of the fork. As regards the coupling method described in FIGS. 13 and 14, this can be used for guided bearings, thus reducing the wear between these bearings and the fingers of the fork. Conversely, the coupling device proposed by the invention between the bearing and the fork can be used for conventional clutch levers.

It goes without saying that the present invention has been described only by way of example and that many alternative forms, either resulting from a combination of the preceding embodiments or not, can be proposed by a person skilled in the art, without departing from the scope of the invention. Thus, equivalents can be proposed for the suspension arm 25, 125 for supporting the lever and participating in guiding the axis of rotation.

I claim:

1. A control linkage for a driven component with a substantially linear travel, in particular a clutch bearing for a motor vehicle, in which a lever, especially a clutch fork, comprises, on respective sides of an axis of rotation, a first arm subjected to the action of a control element and a second arm acting on the driven component, wherein the axis of rotation is movable in relation to a fixed frame and is guided by guide elements along a path generally transverse to the travel of the driven component, and wherein the first arm is connected to the fixed frame by a suspension arm forming a turned-back portion in relation to the lever.

2. A linkage according to claim 1, wherein the suspension arm is connected to the fixed frame substantially in a plane containing the axis of rotation and transverse to the travel of the driven component, the suspension arm being shorter than the first arm of the lever.

3. A linkage according to claim 1, wherein the axis of rotation describes a portion of a cylinder about a fixed reference axis parallel to the said axis of rotation.

4. A linkage according to claim 3, wherein the axis of rotation and the reference axis are connected by a knife-type joint.

5. A linkage according to claim 3, wherein the axis of rotation bears on a cylinder centered on the reference axis.

6. A linkage according to claim 1, wherein the axis of rotation describes a substantially plane surface perpendicular to the travel of the driven component.

7. A linkage according to claim 6, wherein the lever is provided with a boss which interacts, by means of a portion of a cylinder substantially centred on the axis of rotation, with a fixed bearing surface perpendicular to the travel of the driven component.

8. A linkage according to claim 7, wherein the said boss is a rotating roller.

9. A linkage according to claim 7, wherein the said boss is in one piece with the lever.

10. A linkage according to claim 1, wherein the connection between the suspension arm and the first arm is located substantially at the end of the said first arm.

11. A linkage according to claim 1, wherein the suspension arm consists of two half-arms arranged on either side of the path described by the lever during its rotation about its axis.

12. A linkage according to claim 11, wherein the suspension arm is connected to the lever and to the fixed frame by means of joints.

13. A linkage according to claim 11, wherein the suspension arm is deformable and is connected rigidly to the lever and to the frame.

14. A linkage according to claim 11, wherein each half-arm is a rigid strip, of which the dimension measured perpendicularly to the plane formed by the half-arms is the smallest, the said rigid strip being connected to the lever and to the fixed frame by flexible tabs.

15. A linkage according to claim 1, wherein the suspension arm consists of a bracket having deformable sides which are fastened to the fixed frame and to a perpendicular transverse element to which the first arm of the lever is connected.

16. A linkage according to claim 1 wherein means of lateral retention for the lever are located at the level of the axis of rotation.

17. A linkage according to claim 16, wherein the means of lateral retention comprise two opposing parallel flanks with which the lever is provided, perpendicular to the axis of rotation and at the level of the latter, and which interact by means of contact with two fixed bearing faces located between them.

18. A linkage according to claim 1, in which the driven component is a bearing with bearing zones for the action of a clutch fork, wherein this bearing is supported by the fork.

19. A linkage according to claim 18, wherein the bearing is supported by the fork by means of flexible tabs substantially included in the plane of the lever and of its axis of rotation and secured, on the one hand, to a bearing zone of the bearing and, on the other hand, to the fork in a zone other than that designed to interact with the abovementioned bearing zone.

20. A linkage according to claim 19, wherein the flexible tabs are fastened to the lever and to the bearing respectively by means of riveting.

21. A clutch linkage, especially for a motor vehicle, of the kind comprising a clutch bearing supported by a control member, such as a clutch fork, wherein the bearing is supported by the fork by means of flexible tabs substantially included in the plane of the lever and of its axis of rotation and secured, on the one hand, to a bearing zone of the bearing and, on the other hand, to the fork in a zone other than that designed to interact with the abovementioned bearing zone.

* * * * *